United States Patent [19]
Hobbs

[11] Patent Number: 5,751,366
[45] Date of Patent: May 12, 1998

[54] INCLUSION OF AUDIO SIGNAL WITHIN VIDEO SIGNAL

[75] Inventor: Gary Lamont Hobbs, Indianapolis, Ind.

[73] Assignee: Lucent Technologies Inc., Murray Hill, N.J.

[21] Appl. No.: 522,625

[22] Filed: Aug. 31, 1995

[51] Int. Cl.$^6$ .................................... H04N 7/084
[52] U.S. Cl. .................................... 348/480; 348/479
[58] Field of Search .................................... 348/479–486

[56] References Cited

U.S. PATENT DOCUMENTS

| | | | |
|---|---|---|---|
| 3,423,520 | 1/1969 | Kelly | 348/480 |
| 4,156,253 | 5/1979 | Steudel | 348/480 |
| 4,665,431 | 5/1987 | Cooper | 348/480 |
| 4,745,476 | 5/1988 | Hirashima | 348/480 |
| 5,572,654 | 11/1996 | Coelho | 395/788 |

*Primary Examiner*—Victor R. Kostak

[57] ABSTRACT

A system for including audio data within a video signal. The number of frames of video data transmitted is reduced, thereby allowing greater time for each individual frame, thereby allowing the breezeway of each line of each frame to be lengthened. The breezeway resides between the horizontal synch pulse for the line, and the color burst signal. Samples of digitized audio are placed into the breezeways.

5 Claims, 6 Drawing Sheets

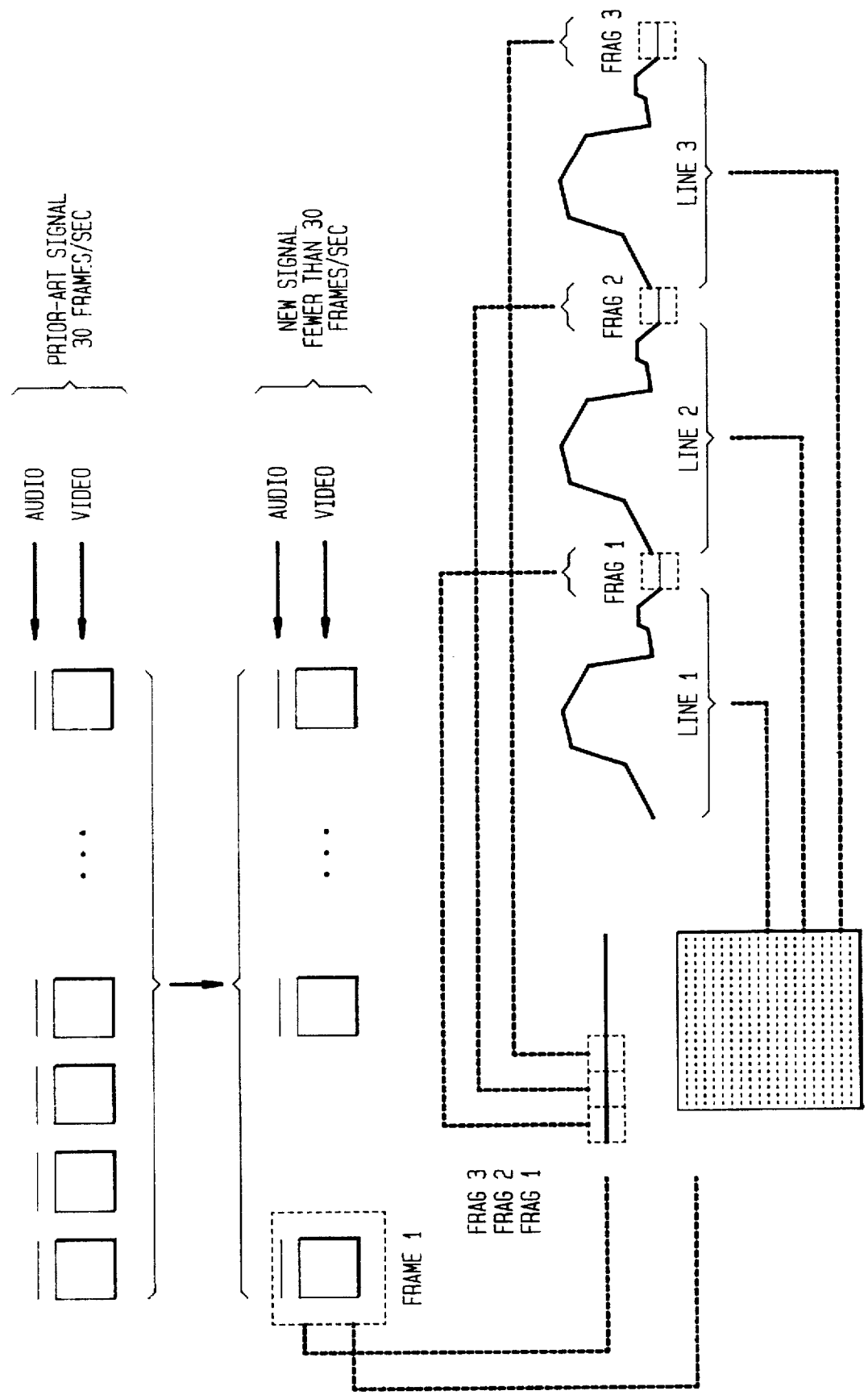

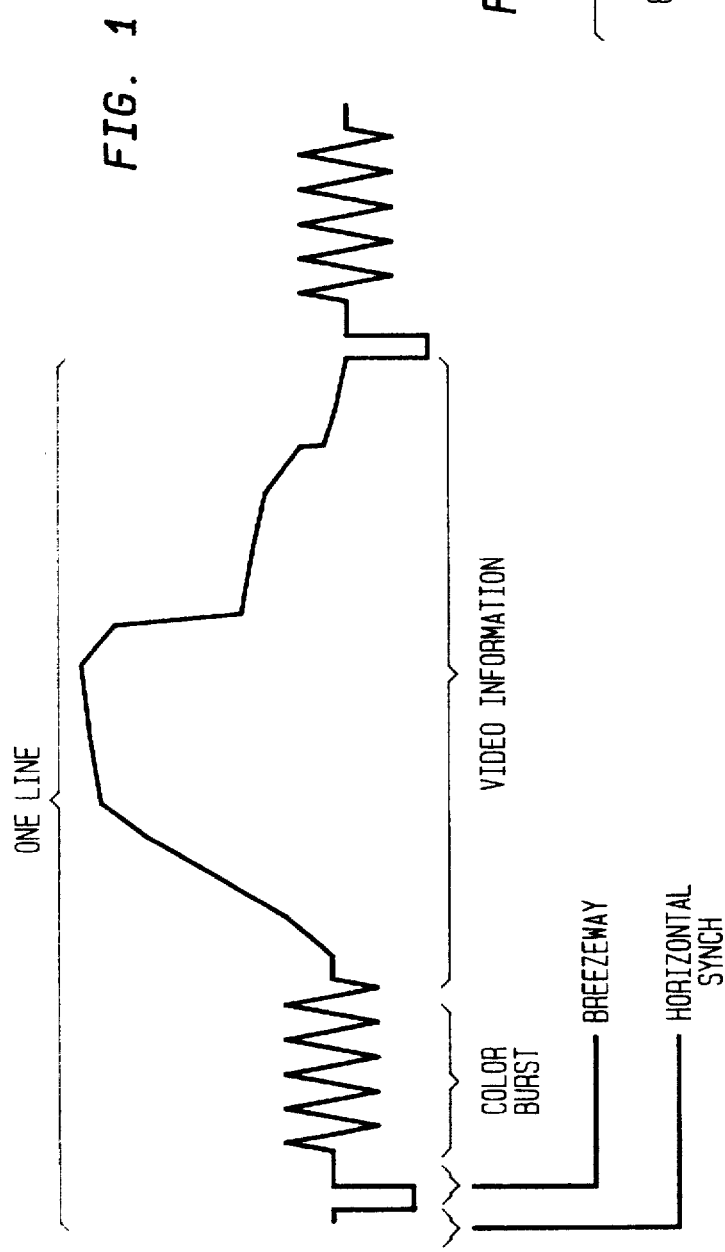
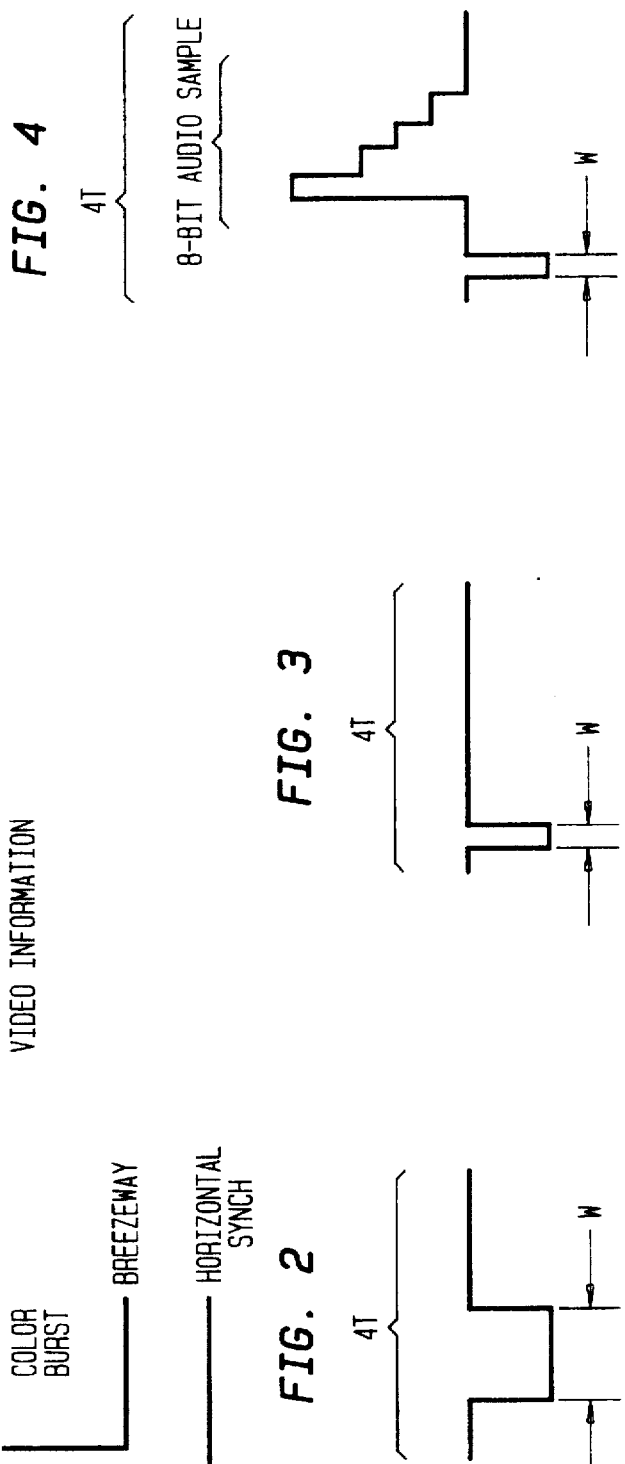

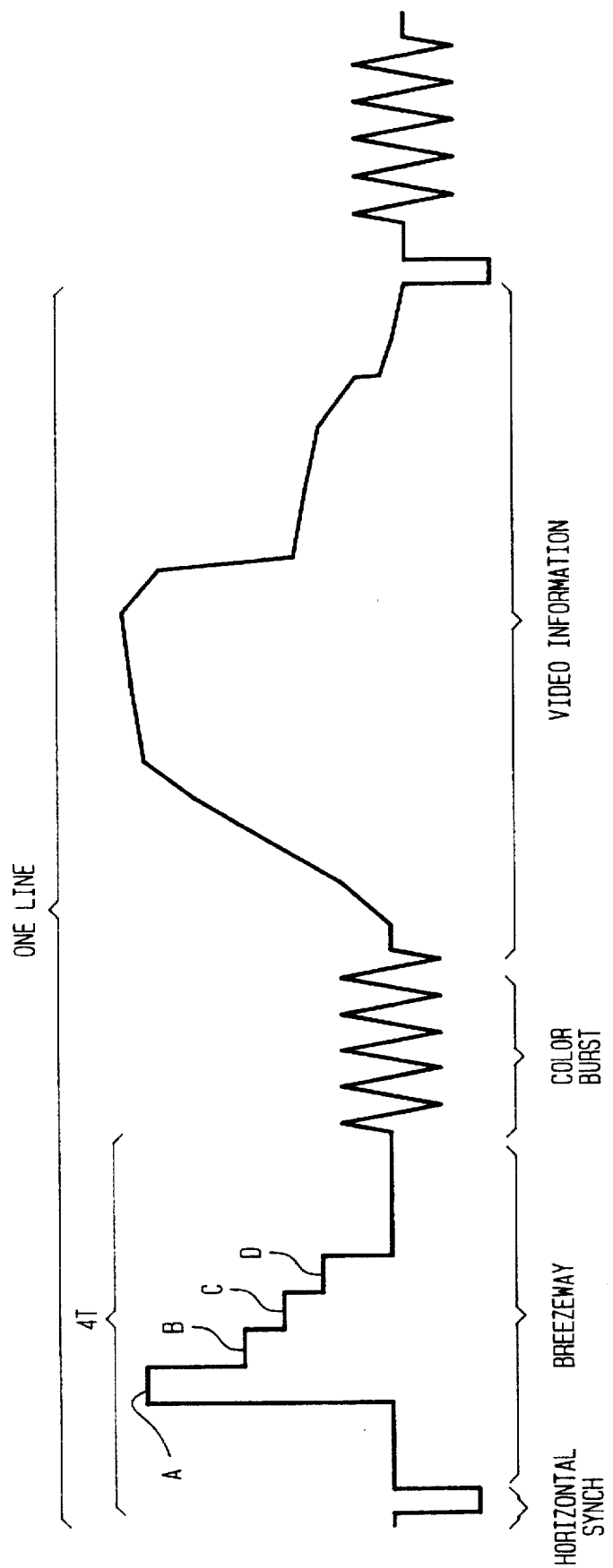

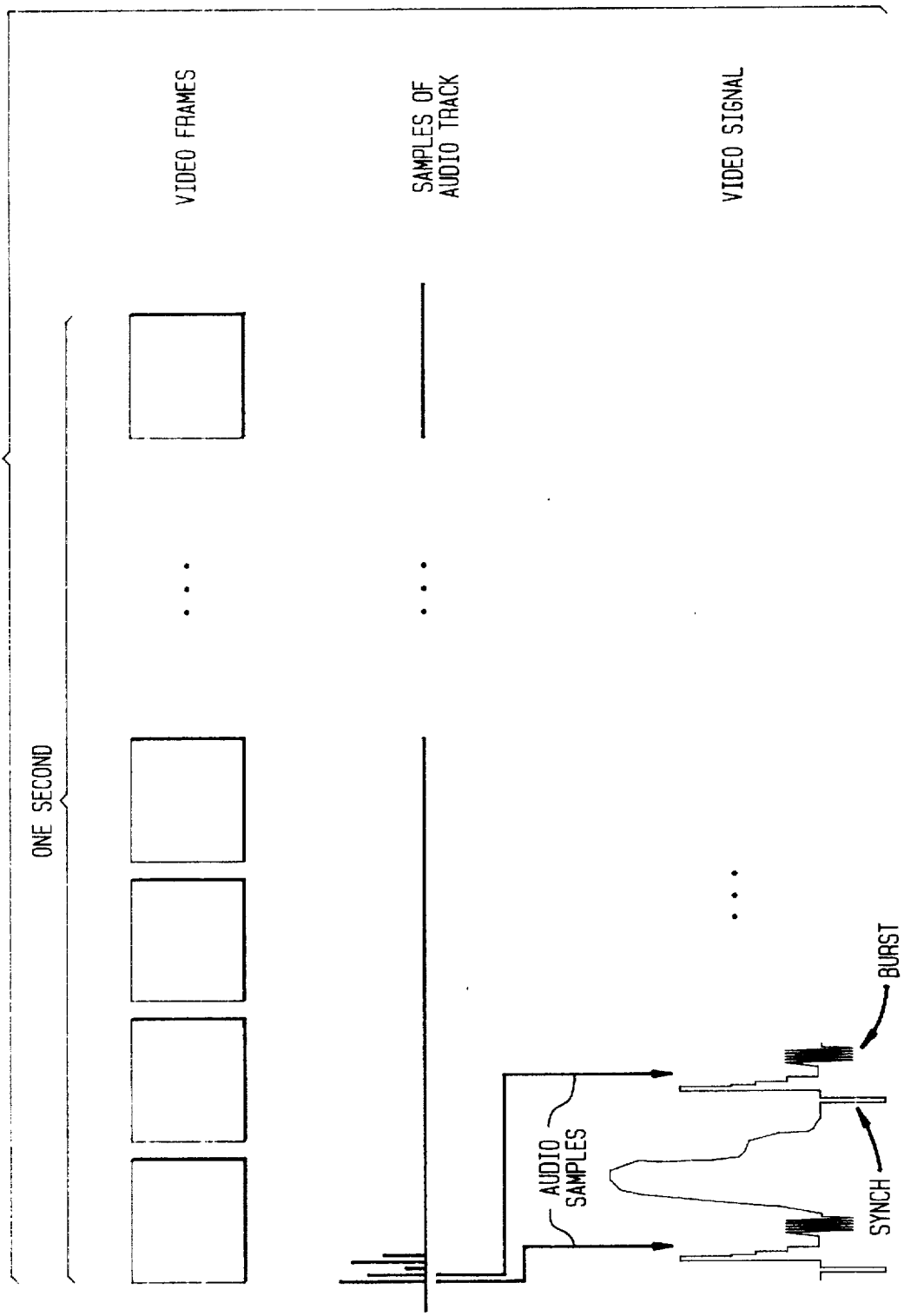

INCLUSION OF AUDIO SIGNAL WITHIN VIDEO SIGNAL

The invention concerns inclusion of a digitized audio signal within a video signal, as opposed to transmitting the audio signal on a separate carrier.

BACKGROUND OF THE INVENTION

Video signals commonly use two separate carriers: one for a video signal, and one for an audio signal. Overall complexity can perhaps be reduced by including the audio signal within the video signal, thereby eliminating one carrier.

However, the video signal ordinarily occupies the bandwidth allocated to it completely. Little space, or none, is available for additional signals.

For example, a typical bandwidth allocated is 6 Mega-Hertz. Under one common video standard, 30 frames of video information are transmitted per second. Each frame contains 525 lines of information. Ordinarily, this video data, together with various control signals, fully occupies the 6 MHz bandwidth.

SUMMARY OF THE INVENTION

In one form of the invention, the number of video frames transmitted is reduced. The reduction generates unused time intervals within the signal. The "breezeways" of the video signal are expanded into these unused time intervals. Digitized audio samples are inserted into the now-expanded breezeways.

BRIEF DESCRIPTION OF THE DRAWINGS

FIG. 1A represents one form of the invention.

FIG. 1 is a simplified schematic of a prior-art video signal.

FIG. 2 illustrates an increase in the time interval T in FIG. 1, which is that allocated to the horizontal synchronization pulse, plus the breezeway.

FIG. 3 illustrates shrinkage of the horizontal synch pulse of FIG. 2, relative to the time 4T.

FIG. 4 illustrates an 8-bit audio sample contained within interval 4T.

FIG. 5 illustrates a video signal generated under the invention.

FIG. 6 illustrates, in schematic form, one approach to implementing the invention.

DETAILED DESCRIPTION OF THE INVENTION

Overview

Figure 7:
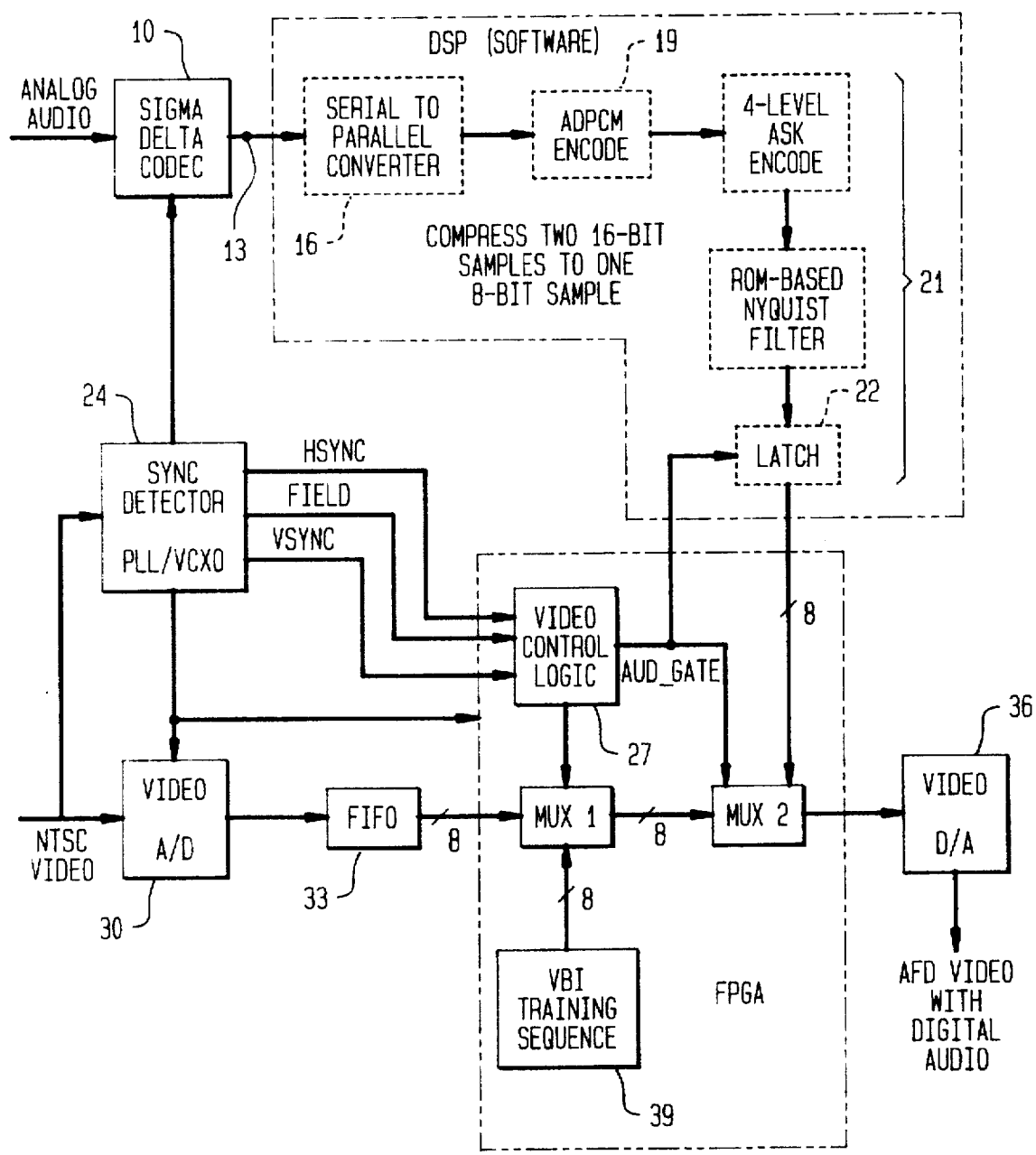
FIG. 7 is a block diagram of hardware for implementing one form of the invention.

FIG. 1A illustrates one view of the invention. A PRIOR ART SIGNAL for television carries 30 frames of video information per second, plus an AUDIO signal on a separate carrier. The invention reduces the number of frames transmitted, as indicated.

One approach to this reduction is called the Alternate Field Drop (AFD) method, wherein three of every four frames are eliminated, or "dropped," and the single remaining frame, of each set of four, is transmitted. This approach reduces the number of frames from 30 to 7.5, per second.

This reduction increases the time allowable for transmission of each frame. The invention utilizes the time increase by increasing the time spacing between LINEs, such as the spacing between LINE 1 and LINE 2. The invention inserts audio signals into this newly created spacing. (Ordinarily, the only other signals occupying the spacing between adjacent LINEs are (1) a horizontal synch pulse and (2) if the signal is a color television signal, a color burst signal.)

To insert the audio signal into the spacing, the invention divides the audio signal into fragments, such as FRAG1, FRAG2, and FRAG3. The invention places each fragment between a pair of LINEs.

Therefore, one characterization of the invention is that it divides the audio signal into fragments, and intersperses the fragments between adjacent LINEs. This is a time-division type of multiplexing.

At least two types of audio fragments can be used: analog and digital. If digital, the analog audio signal is digitized and inserted between the LINEs. In this case, the fragments take the form of digital samples of the audio signal, inserted using an appropriate coding format. One format is discussed below.

If analog, the audio signal can be time-multiplexed, and then inserted between the LINEs. In this case, the fragments take the form of analog sections of the audio signal, which are reassembled at the receiver, by a de-multiplexer.

Advantage

One advantage of this approach can be illustrated by a simple, approximate calculation. The frequency of the horizontal synch pulses is 15.734 KHz. If the audio signal is sampled at this rate, and one sample is placed adjacent each synch pulse (one of which lies adjacent each LINE), then this sampling rate corresponds to the Nyquist rate for 7,867 Hz, which is half the synch-pulse frequency, namely, 15.734/2 KHz.

Thus, this sampling rate accommodates an audio bandwidth of 7,867 Hz, which is substantially higher than the telephony bandwidth of about 3,500 Hz.

If two audio samples are placed adjacent each synch pulse, then the sampling rate becomes twice that above, accommodating a bandwidth of 15.734 KHz (which equals the synch frequency). This bandwidth approaches high fidelity standards.

Greater Detail

Under one common standard for transmission of television signals, thirty frames are transmitted per second, with each frame containing 525 lines of data. FIG. 1 illustrates a simplified version of one LINE of a video signal.

Within the signal, the VIDEO INFORMATION represents the signal which produces a single raster-line on the television screen (not shown). Each line is generated by an electron beam (not shown), which scans left-to-right. The scanning is triggered by the left-most HORIZONTAL SYNCHRONIZATION (SYNCH) pulse in FIG. 1.

A "BREEZEWAY" exists in each line, which is ordinarily not used to carry information. The BREEZEWAY is defined in the art as the part of the signal residing between the rising edge of the HORIZONTAL SYNCH pulse and the edge of the COLOR BURST signal.

One Form of Compression

The BREEZEWAY can be increased in length, by using certain forms of compression, and thereby provide space for carrying information. Under the AFD compression approach, described above, every four frames are reduced to a single frame. This single frame now has available to it the time previously allocated to all four frames. The horizontal synch pulse, plus breezeway, can now be stretched to occupy four times their original time durations.

FIG. 2 illustrates this stretching, and shows interval T in FIG. 1, but stretched to a length 4T. In actual practice, interval T is about 4 microseconds in length, and, thus, interval 4T is four times this length, or 16 microseconds.

However, the original HORIZONTAL SYNCH pulse of FIG. 1 need not be stretched to four times its original width, and need not occupy the entire width W shown in FIG. 2. The invention shortens W to W1, shown in FIG. 3. In practice, a width W1 of about 2 micro-seconds is preferred, leaving 14 micro-seconds for the remainder of the duration 4T.

The invention places one or more digitized fragments of audio into this 14 micro-second interval, as shown in FIG. 4. FIG. 5 illustrates this implementation of the invention, but within the context of an entire line of data. The region 4T corresponds to that shown in FIG. 4, and "T" is designated in FIG. 1.

FIG. 6 illustrates these principles, but from a different point of view. ONE SECOND's worth of information is under consideration, as indicated at the top of the Figure. The SAMPLES OF AUDIO TRACK represent digitized samples of the audio signal. As a simple example, if the audio is sampled at the same frequency as the HORIZONTAL SYNCH PULSE of FIG. 1, then one audio sample is obtained for each SYNCH pulse. Each audio sample can then be positioned adjacent one SYNCH pulse, within the BREEZEWAY accompanying that SYNCH pulse, as indicated by the arrows. Each arrow points to a fragment of audio. Fragments were discussed in connection with FIG. 1A.

One Implementation for Deriving Audio Samples

Sampling and Encoding

Numerous possible approaches are available for sampling the audio signal, and placing samples into the breezeway. One approach will be discussed, and explained with reference to FIG. 7.

The analog audio signal is digitized, or sampled, by a Sigma Delta Codec 10, which produces a serial stream of digital words, at point 13. A serial-to-parallel converter 16 groups the serial stream into groups of two 16-bit samples, and presents the two samples, in parallel, to an ADPCM encoder 19 ("ADPCM 19" herein). ADPCM encoding is known in the art.

The ADPCM 19 compresses the two 16-bit samples to a single 8-bit sample, thereby reducing the amount of data by a factor of four (from 32 bits to 8 bits). Now, a stream of 8-bit samples is available at the output of ADPCM 19.

Figure 8:
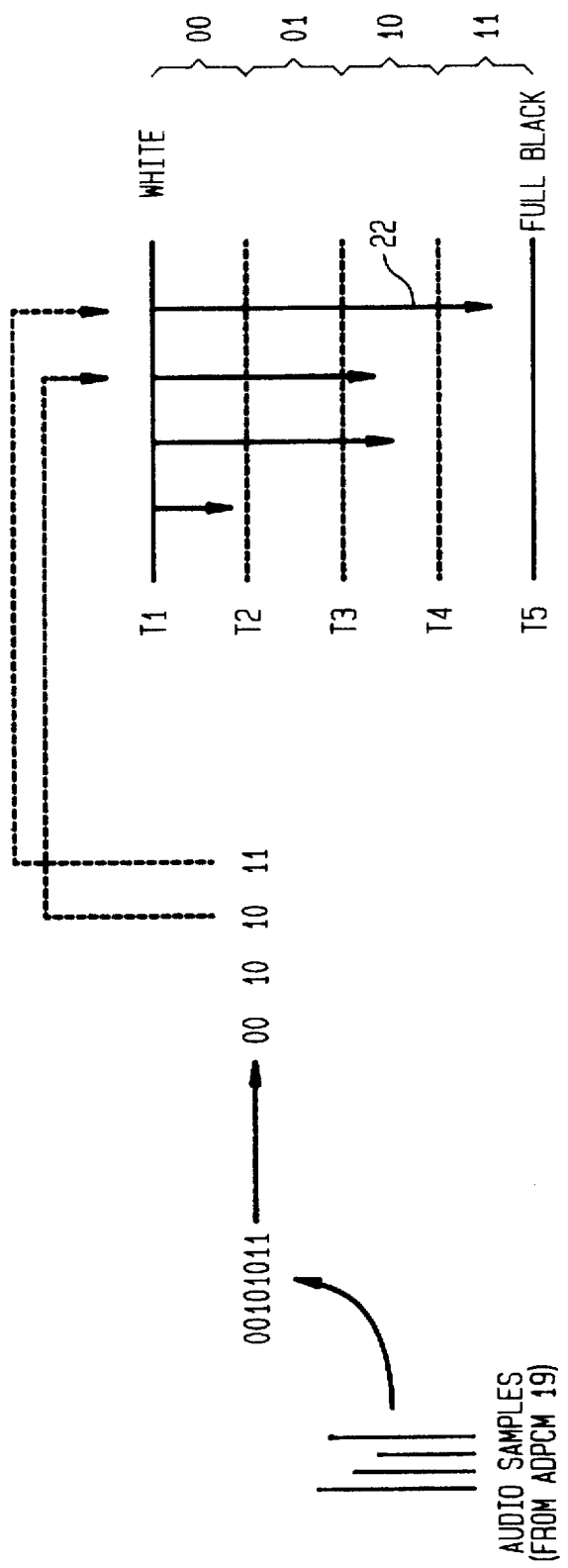
FIG. 8 illustrates one approach to encoding an 8-bit word, wherein the word is broken into four 2-bit words, and each 2-bit word is assigned one of four analog voltages.

The blocks labeled 21 have the following overall effect. They take each 8-bit simple, produced by the ADPCM 19, and divide the 8-bit sample into four 2-bit samples. FIG. 8 illustrates this process. The exemplary 8-bit word "00101011" is divided into four 2-bit words "00", "01", "01", and "00", as indicated.

Each two-bit word is converted, or encoded, into an analog voltage. Because each two-bit word represents a maximum of four possible pieces of information (00, 01, 10, and 11), only four possible analog voltages are required.

The four possible analog voltages which are used take the form of four ranges of voltage, rather than discrete values. TABLE 1, below, and FIG. 8 illustrate the four ranges. The ranges run between the WHITE and FULL BLACK limits of the video luminance signal.

TABLE 1

| Signal Value | Digital Counterpart |
|---|---|
| 0–100 (T1–T2) | 00 |
| 101–160 (T2–T3) | 01 |
| 161–220 (T3–T4) | 10 |
| 221–255 (T4–T5) | 11 |

The parentheticals (eg. T1) refer to the limits shown in FIG. 8, and act as thresholds. As an example, voltage 22 in FIG. 8 lies within the range limited by T4 and T5. It exceeds threshold T4, but not T5. This voltage, and any other lying within the same range, is treated as the 2-bit word "11".

Each 2-bit word is converted into an appropriate analog voltage, as indicated by the example of FIG. 8, and inserted into the BREEZEWAY, as shown in FIG. 5. FIG. 5 shows four step-signals, A, B, C, and D, representing four analog voltages. Each step represents one 2-bit word.

Each 2-bit word is recovered, in digital format, by reversing the procedure shown in FIG. 8. For example, voltage 22 indicates the 2-bit word "11". The recovered 2-bit words are assembled into the original 8-bit word.

Insertion of Audio and Transmission of Reference Levels

The remaining components in FIG. 7 perform two main functions. One, they control the timing of the insertion of the audio samples into the BREEZEWAY shown in FIG. 5. Two, they transmit reference voltage signals, which indicate the thresholds, or limits, T1 through T5 in FIG. 8.

The sync detector 24 in FIG. 7 detects when the various synch pulses occur, and informs the video control logic 27. Based on the timing of the synch pulses, this video control logic 27 combines the audio samples with the video signal, to produce signals as shown in FIG. 5.

That is, the video control logic 27 alternates between the following two steps:

(1) It rout(s the digitized video, digitized by video A/D 30, and buffered by FIFO 33, through multiplexers MUX1 and MUX2, to the video D/A 36.

(2) At the proper times, it routes the four analog signals representing the 2-bit words (as shown in FIG. 8) to the video D/A 36, thereby inserting the four analog voltages into the BREEZEWAY, as shown in FIG. 5.

In addition, four voltages indicating the four thresholds Ti, T2, and T3 in FIG. 8 are transmitted during the vertical blanking interval by VBI training sequence 39 in FIG. 7.

Therefore, to recapitulate in partial fashion, the system of FIG. 7 adds the following data to the video signal:

audio samples (in breezeway), thresholds (eg. T1) (during vertical blanking interval).

The particular embodiment of FIG. 7 indicates that the initial analog video- and audio signals are first digitized. Then, they are processed in the digital domain, prior to being multiplexed (to form the signal of the type shown in FIG. 5), and then delivered to Video D/A 36. Video D/A 36 reconverts the digital signals into the analog domain, for transmission.

Other types of processing, in which audio fragments are inserted into a video signal, as in FIG. 1A, can be undertaken.

Additional Considerations

1. Two sampling rates for the audio signal were discussed above, namely, a rate equal to the horizontal synch pulse frequency, and a rate double that. In general, the invention contemplates sampling at an integral number times the horizontal synch frequency. (Unity is considered an integer.)

2. The invention is suited to use in video conferencing systems, wherein reduction in bandwidth is highly desirable. In particular, it can be used to transmit video conference information both upstream and downstream, using cable television networks.

3. The waveforms shown in FIGS. 1–6 represent electromagnetic field structures. The fields (electric and magnetic) are detectible entities, which travel through space, and carry information.

4. FIG. 5 shows a stepped waveform, which includes steps A, B, C, and D. Each step corresponds to a digitized voltage 22 in FIG. 8. As discussed above, each voltage 22 represents a two-bit number, and thus can be considered as digital data.

Further, each range of voltages in FIG. 8, such as that running from T1 to T2, represents, represents a single two-bit number. That is, one voltage may be very close to T2, and another be very close to T1. But if they are both between T1 and T2, they are treated the same: they both represent 01.

Restated, in theory, each step can assume an infinite number of values. However, in practice, each step actually contains "N" bits of information. (A "bit" of information is well defined in the art of information theory.) "N" in FIG. 8 is two. Other values of "N" can be 1, 3, 4, and 5. A value of N greater than about 10 is considered impractical to implement.

In contrast, analog signals, such as the television luminance signal labeled LINE 1 in FIG. 1A, do not have a corresponding "N."

Numerous substitutions and modifications can be undertaken without departing from the true spirit and scope of the invention. What is desired to be secured by Letters Patent is the invention as defined in the following claims.

I claim:

1. In the generation of a video signal for transmission, the improvement comprising the steps of:
   a) obtaining fragments from an audio signal;
   b) digitizing the fragments;
   c) dividing the digitized fragments into sub-fragments;
   d) assigning to each sub-fragment one of N analog voltages, which analog voltages have values which are separated by threshold voltages;
   e) inserting the analog voltages assigned to the sub-fragments into the video signal; and
   f) inserting signals indicating the threshold voltages into the video signal.

2. Method according to claim 1, in which each sub-fragment is inserted adjacent a horizontal synch pulse within the video signal.

3. In the generation of a video signal for transmission, which is derived from a source video signal which carries about 30 frames of video information per second, the improvement comprising the steps of:
   a) every second, suppressing some of the 30 frames, to thereby increase time available to non-suppressed frames;
   b) in the non-suppressed frames, stretching breezeways to about 16 microseconds in length; and
   c) inserting audio information into the stretched breezeways.

4. Method according to claim 3, in which an average of 23.5 frames per second are suppressed.

5. In the generation of a video signal which contains a breezeway, the improvement comprising the steps of:
   a) increasing time duration of the breezeway; and
   b) inserting audio information encoded in logic having levels greater than binary into the breezeway.

* * * * *